United Sta
Tsukamoto et a.

Re. 28,961
eissued Sept. 14, 1976

[54] METHOD AND APPARATUS FOR MANUFACTURING SOFT METAL SHEATHS FOR ELECTRICAL WIRES

[75] Inventors: Akiyoshi Tsukamoto; Hiroyuki Kumamaru; Koichiro Matsuno; Mahito Ishikawa, all of Yokohama, Japan

[73] Assignee: Sumitomo Electric Industries, Ltd., Osaka, Japan

[22] Filed: Oct. 17, 1975

[21] Appl. No.: 623,220

Related U.S. Patent Documents

Reissue of:

[64] Patent No.: 3,874,076
Issued: Apr. 1, 1975
Appl. No.: 374,151
Filed: June 27, 1973

U.S. Applications:

[63] Continuation of Ser. No. 128,297, March 26, 1971, abandoned.

[30] Foreign Application Priority Data

Mar. 26, 1970 Japan ..... 45-25497

[52] U.S. Cl. ..... 29/624; 29/203 C; 72/343; 156/50; 156/54; 228/129; 228/130; 228/131

[51] Int. Cl.² ..... H01B 13/22

[58] Field of Search ..... 29/203 C, 624, 202.5; 156/47, 50, 51, 52, 53, 54; 72/258, 262, 284, 343, 367, 366; 228/135, 129, 130, 131, 141, 144, 146, 147, 148, 149, 150, 156

[56] References Cited

UNITED STATES PATENTS

| | | | |
|---|---|---|---|
| 2,796,508 | 6/1957 | Holman et al. | 219/61 |
| 3,356,790 | 12/1967 | Polizzano et al. | 29/624 UX |
| 3,590,622 | 7/1971 | Elge | 72/209 |
| 3,648,356 | 3/1972 | Ziemek | 228/130 |
| 3,693,250 | 9/1972 | Brorein et al. | 29/202.5 X |
| 3,716,908 | 2/1973 | Rowell | 228/103 |

FOREIGN PATENTS OR APPLICATIONS

| | | | |
|---|---|---|---|
| 936,434 | 7/1948 | France | 72/343 |

*Primary Examiner*—C.W. Lanham
*Assistant Examiner*—James R. Duzan
*Attorney, Agent, or Firm*—Sughrue, Rothwell, Mion, Zinn and Macpeak

[57] ABSTRACT

Manufacturing of a soft metal sheath formed of aluminum or copper, for example, is improved by suitably selecting the apparatus composing the shaping means employed therein and arranging the capstan and the sinking die in a novel manner. The apparatus selected is made from a wear-resistant synthetic resin such as a molybdenum bisulfide-included nylon. The sheath is manufactured from a metal tape of aluminum or copper through the working stages of applying a cylindrical tube shaped from the tape onto a cable core, butt welding the seam, and then reducing the diameter of the metal tube to connect it to the core.

1 Claim, 10 Drawing Figures

FIG. 1
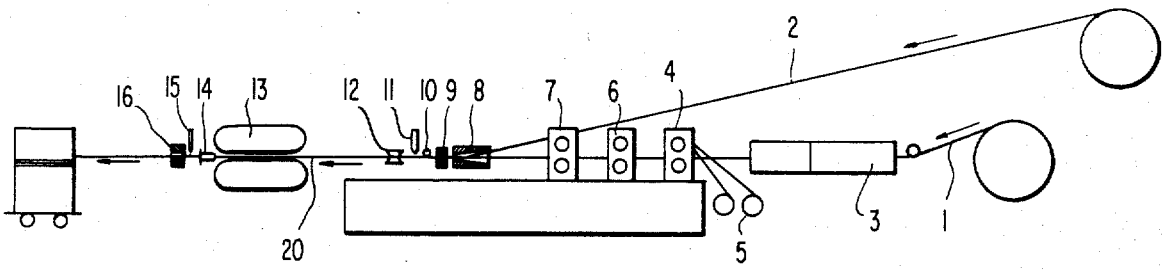
FIG. 2
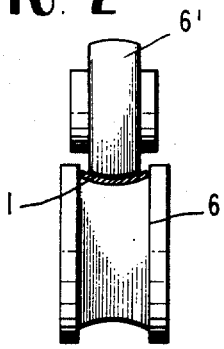
FIG. 3
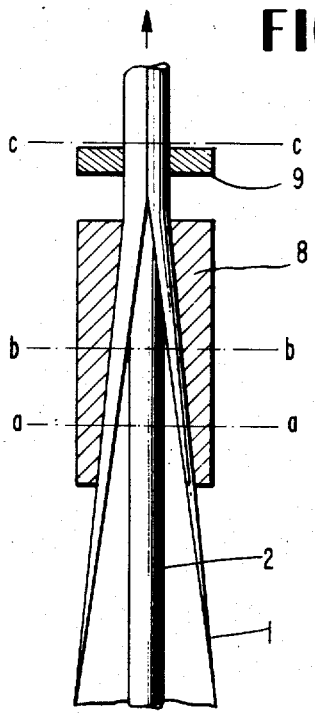
FIG. 3a
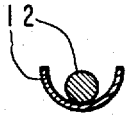
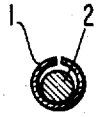
FIG. 3c
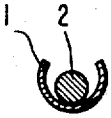
FIG. 3b
INVENTORS
AKIYOSHI TSUKAMOTO
HIROYUKI KUMAMARU
KOICHIRO MATSUNO
MAHITO ISHIKAWA
BY Sughrue, Rothwell, Mion, Zinn & Macpeak
ATTORNEYS FIG. 4
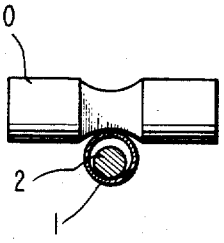
FIG. 5
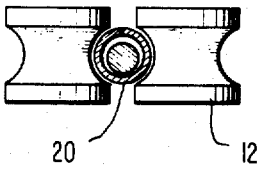
FIG. 6
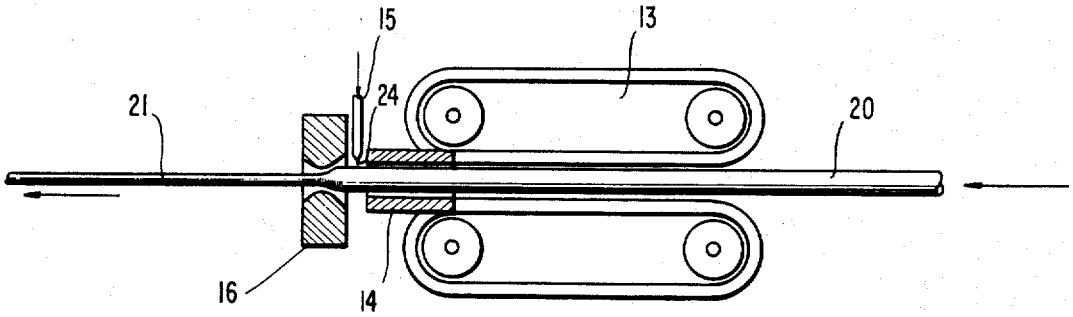
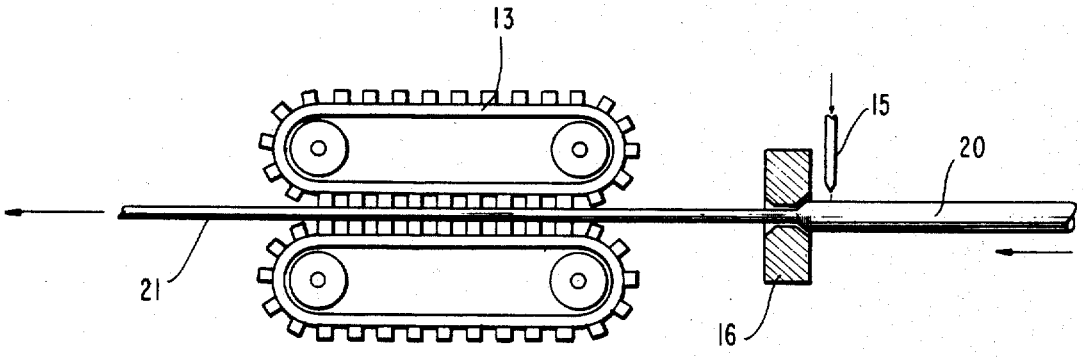
FIG. 7

METHOD AND APPARATUS FOR MANUFACTURING SOFT METAL SHEATHS FOR ELECTRICAL WIRES

Matter enclosed in heavy brackets [ ] appears in the original patent but forms no part of this reissue specification; matter printed in italics indicates the additions made by reissue.

This is a continuation of application Ser. No. 128,297, filed Mar. 26, 1971, and now abandoned.

BACKGROUND OF THE INVENTION

This invention relates to the improvement of the method and apparatus for manufacturing soft metal sheaths for electrical cable wherein a soft metal tape such as aluminum tape or copper tape formed to a cylindrical tubular shape is applied on the periphery of an insulated core for the electrical cable; the butted edges are welded, e.g., by inert gas arc welding; the outer diameter of thus obtained metal tube is reduced; and the insulating core and metal tube are adhered to each other.

Methods are known for forming metal tape in the manufacturing of soft metal sheaths for an electrical cable. In one method, the tape is gradually shaped to a cylindrical form by passing it through a plurality of rollers. In a second method, the tape is arranged in the longitudinal direction and the lateral end portions or ears are formed to a cylindrical shape by means of a metallic forming tool like a shape of a cut open circular tubular pipe. It has been generally found, however, that friction and burning are caused between the tape and the tool, the tension force increased and undesirable faults are generated on the surface of the tape when forming such a soft metal tape by use of a forming tool of steel, particularly in the case of aluminum.

Next, as methods for welding the thus formed seam, the methods of high frequency induction heating or inert gas arc welding are well known. And further, as a method for metal sheathing the periphery of the finished insulated core, the processing by forming a metal tape to a cylindrical tubular shape and continuously welding the butted edges in the longitudinal direction is also known.

However, it is required in the known methods, as mentioned above, to make the inner diameter of the metal tube larger than the outer diameter of the insulated core so as to be able to provide an aperture for thermal insulation between the insulated core and the seam welding portion of the metal tube in order to prevent the melting of the insulated core by heating during the welding operation. Therefore, a working stage is necessary to join the periphery of the insulating core and the inner face of the metal tube to each other after welding.

In the prior methods of manufacture, the metal tube 20 has been reduced by drawing it through a sinking die 16 as shown in FIG. 7. This has caused problems, such as retaining of the lubricating oil supplied onto the metal 20 from a supplying device 15 to lubricate the inner surface of the die 16, causing slipping relative to the traction of the capstan 13 being the extracting means, causing variation in the drawing velocity and encountering troubles on the welding in the previous working stage. It has also been considered to provide a cleaning means to remove such oil, but this would require a very expensive installation and greatly increased manufacturing costs.

SUMMARY OF THE INVENTION

The present invention provides a method and apparatus for manufacturing such soft metal sheaths for electrical wires so as to completely remove the faults caused by the prior methods as mentioned above, by the combination of simple devices and characterized by the two features of selecting the material for the tool for forming the cylindrical tube and arranging of the capstan and the sinking die in a novel manner.

BRIEF DESCRIPTION OF THE DRAWINGS

The details of the present invention will be clear in accordance with description of embodiments of this invention in reference to the accompanying drawings.

In the drawings:

FIG. 1 is a schematic view of the apparatus for practicing the method of the invention;

FIGS. 2 through 6 are the auxiliary elevational views, partly in section, of parts of the apparatus; and FIG. 7 is a schematic view of a prior art manufacturing method.

DESCRIPTION OF THE PREFERRED EMBODIMENT

As shown in FIG. 1, a soft metal tape 1, for example, a soft aluminum tape, is passed through a cleaning device 3 to remove any oil or dirt on the surface of the tape and the cleaned cross section is exposed by slightly cutting off both lateral edges of the soft metal tape by means of a cutting machine 4. Cutting off both lateral edges of the tape permits welding of the edges which are not contaminated by a metallic oxide and at the same time provides a tape width which is of an exact desired dimension to achieve butting of the side edges during welding. The scrap winder 5 serves to coil up the soft metal tape thus cut off. Then, the tape is shaped to an arc by use of an arc shaping device made of a wear-resistant synthetic resin, for example, a molybdenum bisulfide-included nylon, such as the rollers 6 and 7. The front view of the rollers 6 and 6' is shown in FIG. 2. Thereafter, the tape is shaped to a cylindrical form by means of a shaping tool 8 and simultaneously the insulated core 2 is inserted thereinto.

The shaping tool 8 is provided with a conical introducing opening composed of a suitable wear-resistant synthetic resin, for example, a molybdenum bisulfide-included nylon, and the tape passing through the opening is shaped to a cylindrical shape by a drawing operation. FIG. 3a is a plan view of the shaping tool 8 and FIG. 3b shows partially the feature of the processing of the shaping and the mounting of the tape 1 onto the periphery of the insulated core 2 by the tool 8, wherein the cross sectional views of a, b and c respectively correspond to the points of a, b and c in the drawing of FIG. 3a. Numeral 9 shows a forming die composed of a suitable wear-resistant synthetic resin, and the tape 1 forms a cylindrical tube in a complete butted state with a suitable gas between the seam of the tape and the insulating core 2. This condition is shown by c in the drawing of FIG. 3b.

The butted portion of the seam at the both edges of the tape 1 formed to a cylindrical shape is repressed by the repressing rollers 10 as shown in FIG. 4 so as not to cause a step. And the complete butted condition is maintained by the side rollers 12 as shown in FIG. 5. The butted portion of the cylindrical tube maintained under such condition is seam welded with the electrode 11 of the inert gas arc welding machine.

Next, the metal tube 20 comprising the insulated core is pulled by means of a capstan as shown by 13 in FIG. 6. To prevent the soft metal tube from buckling, it is passed through a guide 14 provided with a circular introducing opening mounted on the outlet of the capstan 14. 16 shows the sinking die which reduces the diameter of the metal tube by pushing inwardly such that the outer surface of the insulated core and the inner surface of the metal tube are in close relation to each other.

Prior to entering into the sinking die 16, a lubricating oil is dropped on the metal tube from a nozzle of an oil supplying means as shown by 15 to make the reducing operation smooth.

By the method of the present invention, the cylindrical metal tube can be readily obtained without causing defects on the surface of the soft metal tape by simply combining forming tools of a wear-resistant synthetic resin and the soft metal sheathed cable, in which the mechanical strength is guaranteed, and by combining suitable welding methods such as the inert gas arc welding method. By changing the pulling-out method to the pushing-in method in reducing the diameter of the metal tube, a slip between the capstan and the soft metal tube brought about by the lubricating oil is eliminated and a stable extracting linear velocity can be established, thereby obtaining a stable welding workability.

And further, a cleaning means for removing the lubricating oil retained on the tube becomes unnecessary, and it is greatly advantageous for reducing the manufacturing cost.

And furthermore, by this pushing-in method, a high quality product, extremely high in roundness, can be obtained by a final reduction of the diameter of the soft metal tube after extracting the soft metal tube comprising the insulated core by means of the capstan. In contrast to that, by the prior art method shown in FIG. 7, the soft metal tube tends to deform to an elliptic shape as the tube is clamped with a capstan and pulled after final working for the reducing of the diameter.

As described above, in accordance with the method and apparatus of the present invention, the adjustment of the manufacturing apparatus is very easy and the method has great advantages over the prior method from the standpoint of quality of the product and the installing cost.

While the preferred form of method and apparatus embodying the invention is illustrated and described, it will be understood that changes in the method and apparatus may be made within the scope of the appended claims.

We claim:

1. In a method of continuously manufacturing a soft metal sheath electric cable by moving a soft metal tape longitudinally in unison with a core and wrapping said tape about said core, the improvement comprising the steps of, in sequence:

surface cleaning said soft metal tape whose width is in excess of that needed to laterally envelope the cable core, cutting off both side edges of said tape to reduce the width of said tape to a dimension such that the side edges will exactly abut when laterally wrapped about the core and to provide abutting side edges which are oxide free, bending said tape into an arc in cross section by passing said tape through opposed concave and convex wear resistant plastic rollers, butting said oxide free tape side edges together by passing said arc-shaped tape through a wear resistant plastic cylindrical shaping tool and a wear resistant plastic forming die having a circular opening therein, seam welding the butting oxide free side edges, extracting the tube from said forming die and pushing the tube through a reducing die under lubrication by means of a capstan positioned upstream of the reducing die and downstream of the forming die to uniformly radially inwardly reduce the tube to mechanically couple the soft metal tube to the outer surface of the cable core with true circular cross section provided thereby.

* * * * *